United States Patent [19]

Higashizume et al.

[11] 4,228,267

[45] Oct. 14, 1980

[54] METHYL METHACRYLATE-BASED RESIN FILM AND SHEET

[75] Inventors: Ryuichi Higashizume; Masahiko Iyoku, both of Suzuka, Japan

[73] Assignee: Asahi-Dow Limited, Tokyo, Japan

[21] Appl. No.: 72,170

[22] Filed: Sep. 4, 1979

[30] Foreign Application Priority Data

Sep. 9, 1978 [JP] Japan .................................. 53-110228
Dec. 13, 1978 [JP] Japan .................................. 53-153173
May 8, 1979 [JP] Japan .................................. 54-055240

[51] Int. Cl.$^2$ ............................................ C08F 220/14
[52] U.S. Cl. ............................ 526/328.5; 260/45.8 R; 260/45.95 F; 264/291; 428/412; 428/522; 528/502
[58] Field of Search ...................... 526/328.5, 329.7; 528/502; 260/45.8 R, 45.95 F

[56] References Cited

U.S. PATENT DOCUMENTS

| | | | |
|---|---|---|---|
| 2,321,759 | 6/1943 | Macht et al. | 528/502 |
| 2,968,065 | 1/1961 | Gronholz | 528/502 |
| 3,637,545 | 1/1972 | Fivel | 526/329.7 |
| 3,950,314 | 4/1976 | Graff | 526/328.5 |
| 4,110,526 | 8/1978 | Hamada et al. | 526/329.7 |
| 4,175,176 | 11/1979 | Ozawa et al. | 526/328.5 |

*Primary Examiner*—Harry Wong, Jr.
*Attorney, Agent, or Firm*—Cushman, Darby & Cushman

[57] ABSTRACT

Methyl methacrylate-based resin films and sheets are formulated in a specific composition and molded so as to acquire a specific supra-molecular structure and prove to be useful in fields which demand mechanical properties such as folding endurance and impact resistance in addition to the various characteristics inherent in methyl methacrylate-based resins.

7 Claims, 7 Drawing Figures

METHYL METHACRYLATE-BASED RESIN FILM AND SHEET

BACKGROUND OF THE INVENTION

1. Field of the Invention

This invention relates to films and sheets made of an amorphous, high-molecular methyl methacrylate-based resin (hereinafter referred to as "MMA-based resin") and possessed of a specific supra-molecular structure.

More particularly, this invention is directed to providing MMA-based resin films and sheets which possess a specific structure of molecular orientation, excel in folding endurance, high-speed tensile strength and falling dart impact resistance and are notably improved in practical-service characteristics such as stress crack resistance (critical elongation), shrinkage in boiling water and tear resistance.

2. Description of the Prior Art

Heretofore attempts have been made to manufacture MMA-based resin useful in the aforementioned fields of actual service. None of them, however, have yielded any satisfactory results.

Some of the MMA-based resin films already have been introduced to the market. None of these films on the market have been found to possess properties completely satisfactory from the practical point of view.

For example, those MMA-based resin films available on the market are of a type modified with rubber and, therefore, offer poor resistance to scratches and readily yield to scratches over their entire surface. Besides, since they are made barely resistant to weathering by incorporation of a large amount of a pigment, the pigment thus abundantly present notably degrades the properties inherently possessed by the MMA-based resin and further impairs the film's transparency.

The MMA-based resin, by nature, is rigid and brittle. Thus, the resin has the disadvantage that any article produced by molding the resin in a thin wall thickness lacks flexibility and exhibits heavily degraded toughness, making it hardly possible for any practicable use.

It has been suggested to the art to remedy these drawbacks by incorporating into the MMA-based resin a diene type elastomer (Japanese Patent Publication No. 17806/1968) or a vinyl acetate copolymer (Japanese Patent Publication No. 32181/1973) or by subjecting methyl methacrylate containing an acrylic ester to multi-stage polymerization in the presence of an alkyl acrylate elastomer (as disclosed in the specification of U.S. Pat. No. 3,562,235), for example.

Although the methods thus proposed for the improvement of the MMA-based resin are indeed capable of imparting softness to the film and consequently improving the film's flexibility and toughness to some extent, they nevertheless impair notably the inherent properties of the MMA-based resin such as weathering resistance, scratch resistance, transparency, specular gloss, and resistance to chemicals and pollutants.

Japanese Patent Publication No. 13220/1974 discloses a method for manufacturing a stretched film possessed of a particularly high tensile strength in one direction by subjecting the MMA-based resin to biaxial stretching. The stretched film possessing a particularly high tensile strength in one direction which is produced by this method is entirely different from the film and sheet possessing a specific supra-molecular structure as contemplated by the present invention.

SUMMARY OF THE INVENTION

An object of this invention is to provide the film and sheet of MMA-based resin which possess in a well-balanced combination the various long-sought mechanical properties such as folding endurance, high-speed tensile strength, falling-dart impact resistance, critical elongation (i.e., stress crack resistance), shrinkage in boiling water and resistance to tear and also retain, intact, the inherent properties of the MMA-based resin such as weathering resistance, scratch resistance, transparency, specular gloss and resistance to chemicals and pollutants.

To be more specific, this invention relates to the film and sheet of MMA-based resin of a specific supra-molecular structure containing therein 1 to 15% by weight of an alkyl acrylate the alkyl group of which has one to four carbon atoms and 0 to 3% by weight of an ultraviolet-ray absorbent, which MMA-based resin film and sheet possess a melt flow rate in the range of 0.5 to 12 g/10 min. (as determined under the conditions I, specified in ASTM D1238-70), an orientation-release stress in the range of 5 to 30 kg/cm$^2$ (based on the method of ASTM, D1504, a ratio of orientation-release stress in two perpendicular directions in the range of 1 to 2 (namely, the ratio of the value of stress in the direction of the maximum orientation-release stress to that in the direction of the minimum orientation-release stress), a difference of orientation-release stress in the two directions of not more than 10 kg/cm$^2$ (namely, the difference of the value of stress in the direction of the minimum orientation-release stress subtracted from that in the direction of the maximum orientation-release stress), a high-speed tensile strength of not less than 7 kg/mm$^2$ and a critical elongation of not less than 0.1%.

The film and sheet of this invention, because of the specific supra-molecular structure possessed thereby, find practical utility in various fields which have to date defied successful use of the conventional MMA-based resin film and sheet, such as:

(1) The field of mechanical fabrication wherein the film and sheet are expected to possess toughness enough to permit mechanical processings such as winding on bobbins, cutting with slitters and printing in presses.

(2) The field of molding wherein the film and sheet, either alone or in the form of composites with some other substances, are laid along the contours of dies and subjected to mechanical folding or thermal molding for producing a vessel such as a washbasin, etc.

(3) The field of the shrink art wherein the films and sheets having calligraphic patterns and printed patterns applied in advance thereto are shrunken to produce contracted film and sheet carrying therein the patterns in a proportionally reduced size.

(4) The field of composite lamination wherein the conventional thick-walled sheets of MMA-based resin are substituted with a composite laminate obtained by having the film and sheet of MMA-based resin fastened to the surfaces of a substrate, with a view to improving the characteristics of the substrate itself and, at the same time, saving natural resources in the manufacture of laminate products as a whole.

(5) The fields wherein the inherent characteristics of MMA-based resin are utilized to advantage, such as, for example:

The field of optical articles such as safety glass and stained glass which make effective use of the resin's transparency and scratch resistance.

The field of durable consumer goods and building materials such as reflecting mirrors, solar heat absorbing boards, external shells of buildings and sign boards which invariably make use of the resin's high weathering resistance.

The field of electric illumination boards and decorative boards which make use of the resin's decorativeness combining printability, specular gloss and transparency and the field of applications directed to economized use of paints.

The field of show windows, film and sheet structures for agricultural uses and transparent enclosures for medical treatments which make use of the resin's ability to permit the incorporated ultraviolet-ray absorbent to retain its absorbing property intact for a long time.

(In these fields, the film and sheet may be used either alone or in combination with other suitable materials such as in the form of laminates.)

As a result, the MMA-based resin film and sheet of the present invention enjoy notably increased practical utility as compared with any of the conventional countertypes.

DETAILED DESCRIPTION OF THE INVENTION

It has heretofore been widely held that the amorphous state of the polymer is materialized because the polymer initially kept in a liquid or rubbery state beyond its glass transition temperature, on being cooled, assumes the state of glass while the molecular chains thereof are retained in their stage of thermodynamic equilibrium. In this case, the amorphous structure is considered to be in a homogeneous one-phase random coil state having molecular chains randomly arranged and coordinated therein. It has been a generally accepted theory, therefore, that the amorphous polymer assumes no molecular-chain form of any regularity.

More recent studies, however, have led to the discovery that even the amorphous polymer has structural regularity of a microscopic order. Morphological studies resorting to observation of light-field images and dark-field images, studies of electron diffraction images, measurements of thermal properties and measurements of tensile yield strength and density have given data which invariably afford evidence to show that even in the structure formerly accepted as amorphous, there actually exists the structure of globular nodules possessing the regularity of molecular-chain arrangement similar to the structure of crystals. As a result, the two-phase model consisting of a grain phase and an intergrain phase has been proposed to take the place of the time-honored random coil model for the purpose of accounting for what has heretofore been called an amorphous structure.

The inventors carried out a concentrated study on the so-called amorphous structures of non-crystalline polymers, particularly of polymethyl methacrylates from the standpoint of changes in their molecular-chain arrangements and thermal behaviors. This study led to the surprising discovery that the stretched film and sheet of a specific MMA-based resin exhibit specific behaviors in dynamic properties, particularly in folding endurance, high-speed tensile strength, critical elongation and tear resistance. The inventors have continued an earnest study based on this new knowledge and have now perfected stretched film and sheet of MMA-based resin which possess a special supra-molecular structure.

Although the morphological observation of images or the X-ray or electron-beam diffraction of images touched upon above may be available for the elucidation of this supra-molecular structure, the inventors have elected to explore the supra-molecular structure of the MMA-based resin through the measurement of thermal properties with emphasis focussed on the practicality of observation.

The words "measurement of thermal properties" as used herein mean the measurement of the thermal properties, particularly the state of molecular-chain arrangement, of the polymer film and sheet. To be specific, this measurement is obtained by the determination of ORS in accordance with the method specified by ASTM, D1504.

Figure 1:
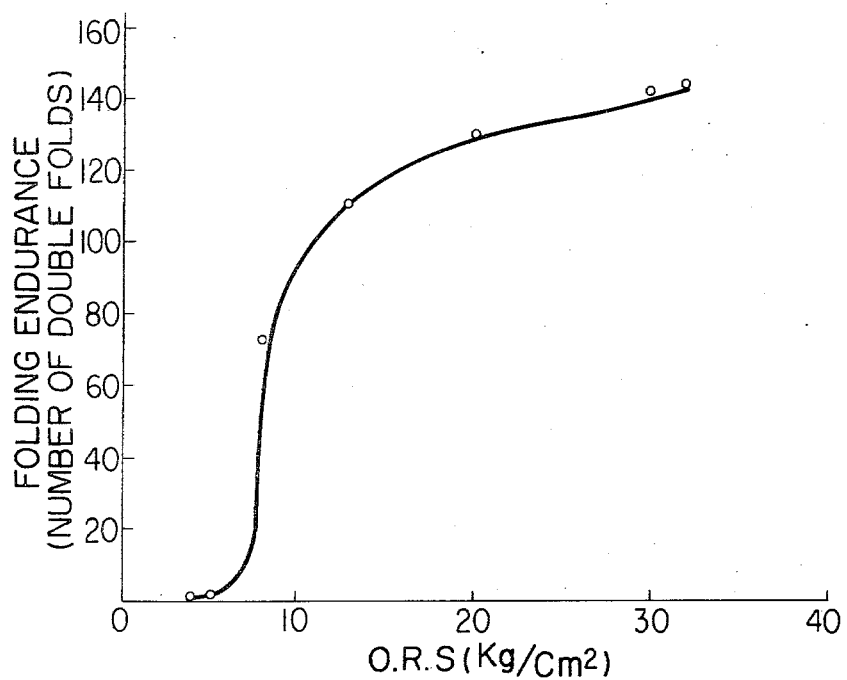
FIG. 1 is a graph showing the relation between the ORS (orientation release stress) value and the folding endurance.
Figure 2:
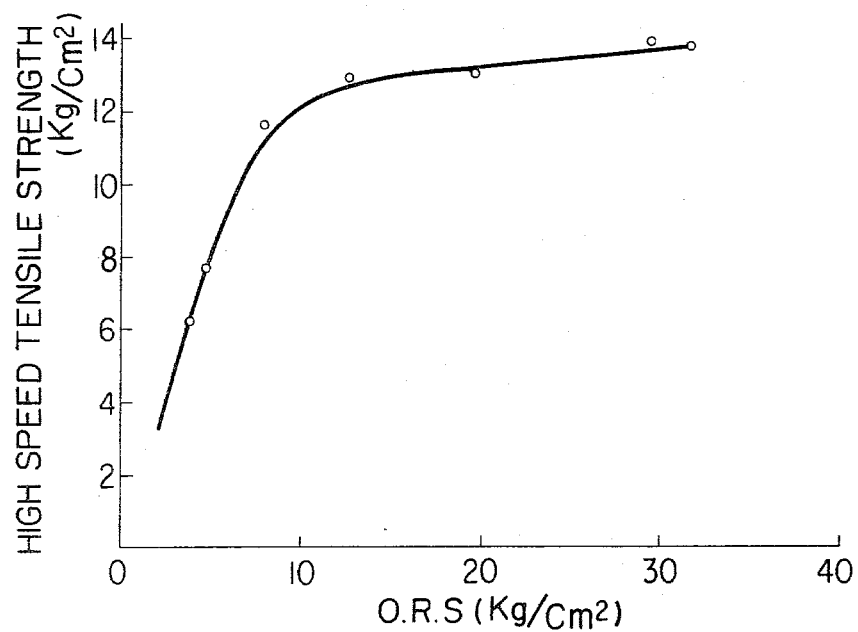
FIG. 2 is a graph showing the relation between the ORS value and the high-speed tensile strength.
Figure 3:
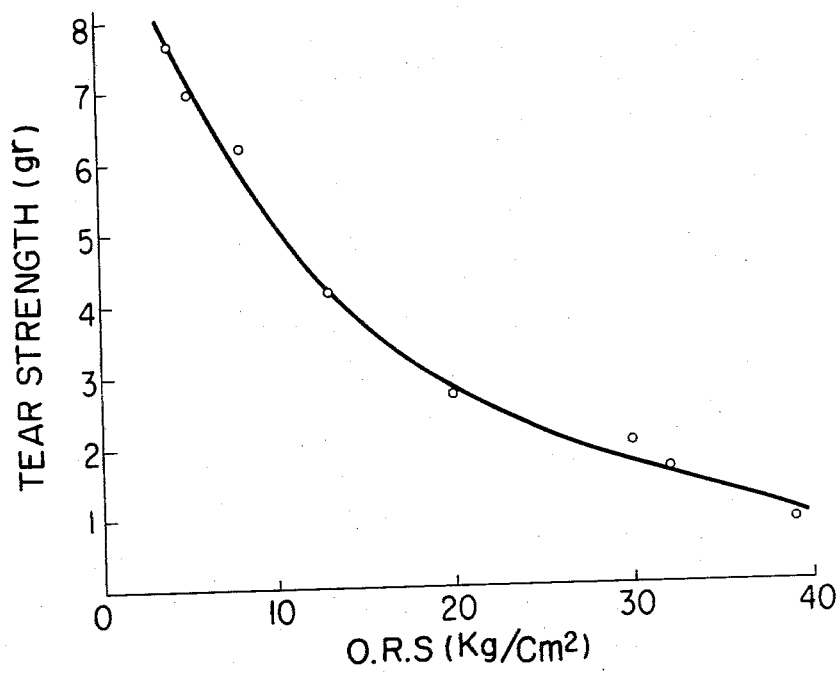
FIG. 3 is a graph showing the relation between the ORS value and the tear strength.

The properties of the stretched film and sheet of the MMA-based resin such as the folding endurance and high-speed tensile strength are represented in the form of functions of the ORS values of FIGS. 1, 2 and 3.

What is particularly noteworthy about of this invention is the fact that the following peculiar phenomena are observed between the thermal properties of the film and sheet of the specific supra-molecular structure as defined by this invention and the other mechanical properties, provided that the thermal properties are represented in terms of the ORS values of the film and sheet.

By "ORS" as used in this invention is meant the stress which is generated when the molecules thermally oriented in the film and sheet tend to return to their original state upon exposure to heat. The heat transfer medium used in the measurement of ORS is the air adjusted to a temperature which is the sum of the Vicat softening point of the base resin under test plus 50° C. It has been confirmed that in the amorphous, rigid film and sheet made of a styrene-based resin or MMA-based resin, the temperature dependency of ORS is substantially nil at the temperature which is the sum of the aforementioned temperature ±30° C. and that, therefore, the values obtained by this measurement are dependable.

The Vicat softening point as referred to in this invention is that which is measured under the conditions of 1 kg of load and 120° C./hr of temperature increase rate as specified by ASTM, D1525. The ORS value, therefore, proves to be an effective instrument for practical representation of the variation in the state of arrangement of molecules oriented in the film and sheet.

In FIG. 1, when the ORS values indicated are evaluated from the viewpoint of folding endurance, it is seen that the durability of film to the repeated folding as expressed by the number of foldings given to the film is notably improved beyond the boundary of about 8 kg/cm² of ORS value.

This fact constitutes itself truly surprising evidence which overthrows the widespread belief that any of the conventional MMA-based resins, when molded in a small wall thickness, readily yields to rupture even under a slight bending load.

In FIG. 2, when the ORS values are evaluated from the viewpoint of the high-speed tensile strength, it is seen that, similarly to the data of FIG. 1, the high-speed tensile strength of the film sharply improves beyond the boundary of about 8 kg/cm² of ORS value, suggesting that the MMA-based resin of this invention produces film and sheet articles of high toughness hardly expected in the film and sheet articles made of the conventional MMA-based resins. It is nevertheless important to note at this point that, as the ORS value increases past the level of 30 kg/cm² and approaches the level of 40 kg/cm², the measurement of the high-speed tensile strength suffers from increasingly poor reproducibility and eventually fails (Test Piece No. 6 in Comparative Example 3).

To account logically for this phenomenon, the inventors offer a postulate that when the orientation of molecules proceeds to an excess, the supra-molecular structure defined by the present invention undergoes a change again and reaches a zone which can no longer be expressed by the ORS value alone.

Taking notice of the critical elongation which has an important bearing on the structure of molecular orientation, the inventors have evaluated the ORS value also in terms of the critical elongation. The critical elongation is an index representing stress crack resistance and defined in later description.

acquire outstanding mechanical properties as the ORS value increases past the level of about 5 kg/cm², particularly the level of 8 kg/cm², and that, when the ORS value further increases to exceed the level of 30 kg/cm², however, the structure reaches a zone which can no longer be successfully expressed solely in terms of the ORS value.

Figure 4:
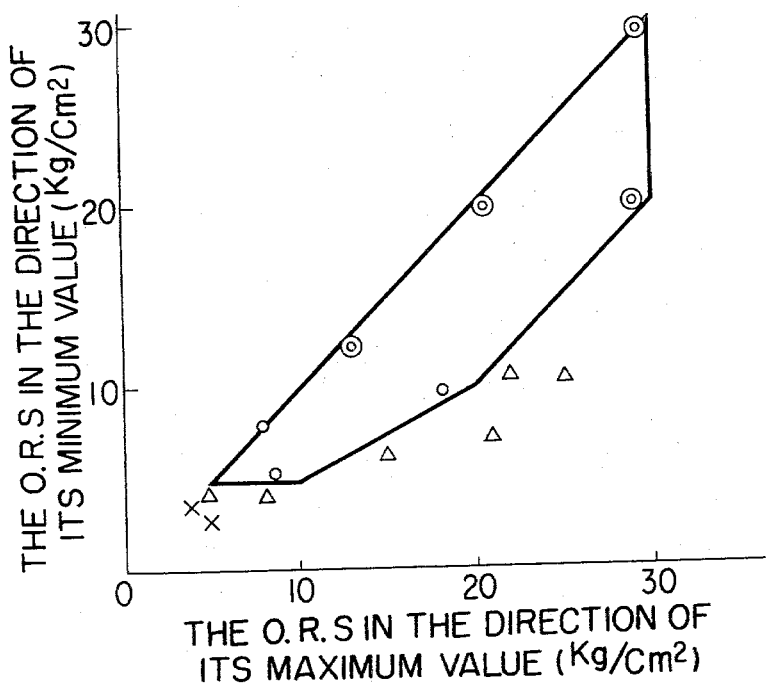
FIG. 4 is a graph illustrating proper balance of ORS.

When the relation between the ratio of orientation release stress [(The orientation release stress in the direction of its maximum value)÷(The orientation release stress in the direction of its minimum value)] (hereinafter referred to as "ORS ratio") and the difference of orientation release stress [(The orientation release stress in the direction of its maximum value)−(The orientation release stress in the direction of its minimum value)] (hereinafter referred to as "ORS difference") is evaluated from the viewpoint of falling dart impact resistance, the results are as shown in FIG. 4.

It is noted from FIG. 4 that even when the ORS value falls in the range of from 5 to 30 kg/cm², the falling dart impact resistance has a low value (below the level of 6 kg.cm.) If the ORS ratio fails to fall in the range of 1 to 2, preferably 1 to 1.5, and the ORS difference exceeds the level of 10 kg/cm² (indicated by the marks, Δ and x).

The film and sheet of the present invention, when evaluated for their practical worth in terms of the aforementioned mechanical properties such as falling dart impact resistance, high-speed tensile strength, folding endurance and tear strength, give the following results.

First, the scale of rating of falling dart impact resistance shown in FIG. 4 is noted to be in agreement with that of rating of practical worth indicated in Table 1 below.

TABLE 1

| Scale of rating | Mechanical property Falling dart impact resistance (kg . cm) | Practical worth | |
|---|---|---|---|
| | | Results of punching test | Results of cutting test with rotary blade |
| ◎ | Not less than 9 | Good | Good |
| O | Not less than 6 and less than 9 | Inferior punching in some samples | Good |
| Δ | Not less than 4 and less than 6 | Inferior punching in many samples | Inferior cutting in some samples |
| x | Less than 4 | Inferior punching in many samples | Inferior cutting in many samples |

Figure 7:
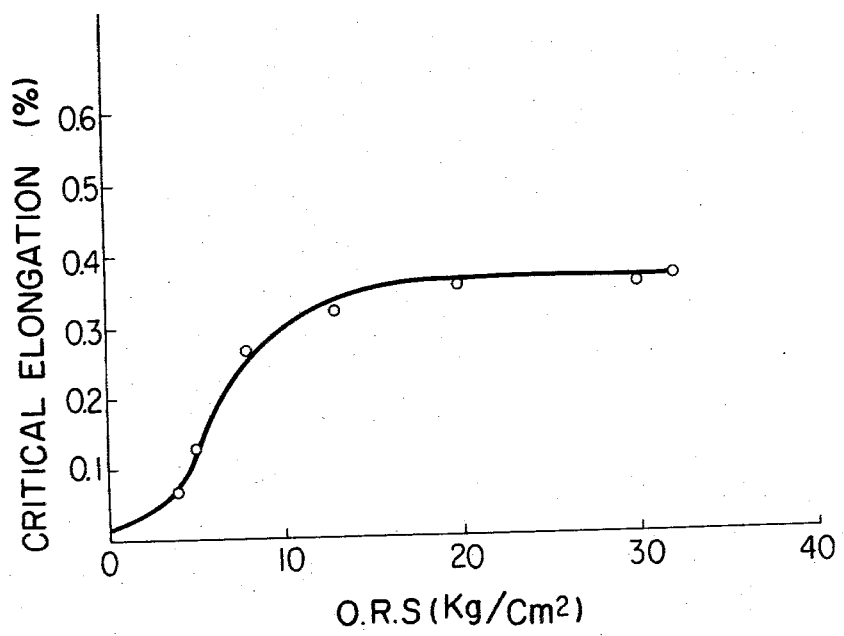
FIG. 7 is a graph showing the relation between the ORS value and the critical elongation.

In FIG. 7, it is observed that while the film sample having an ORS value of less than 5 kg/cm² readily sustains a crack even below 0.1% of critical elongation, the film sample having an ORS value exceeding 5 kg/cm² retains the value of at least 0.1% and the film sample having an ORS value exceeding 8 kg/cm² no longer sustains any crack below the level of 0.25% of critical elongation. In the case of the film sample having an ORS value of about 40 kg/cm² (Test Piece No. 6 in Comparative Example 3), the measurement of critical elongation itself lacks reproducibility, giving support to the aforementioned postulate based on the re-change of the supra-molecular structure.

In FIG. 3, when the ORS value is evaluated from the viewpoint of tear strength, it is clear that the tear strength falls in proportion as the ORS value increases past the level of 8 kg/cm² and that the tear strength degrades when the ORS value exceeds the level of 30 kg/cm².

Through synthesis of the foregoing results of FIGS. 1, 2, 3 and 7, it is learnt that the special supra-molecular structure defined by the present invention comes to (Refer to Example 5 and Comparative Example 5.)

It is now assumed that the same film as that which gives the results indicated in FIGS. 1 through 4 is joined face-to-face with a polycarbonate sheet in an effort to produce, for practical use, a laminated plastic glass possessed of the improved surface characteristics of the polycarbonate. The impacts which are exerted on the laminate during its actual use, more often than not, function in the form of instantaneous tension on the interface between the two component films. It has been demonstrated that in this case, the laminate is required to offer at least 7 kg/mm² of high-speed tensile strength to withstand the impacts. It has been also found that since the instantaneous tension naturally exerts its effect simultaneously in the two perpendicular axes, namely in the longitudinal and lateral axes, the laminate offers effective resistance to the tension when it retains high-speed tensile strengths each exceeding 7 kg/mm² in a well-balanced state in the two axes.

It is assumed that a given film is transferred by having it wound up in a roll (in much the same way as when the film is taken up on a bobbin). It has been demonstrated that the film is wound in a roll with extreme difficulty and the film, if managed somehow or other to be wound up in a roll, sustains numerous cracks when the film fails to endure just one folding, whereas the film can be successfully wound up in a roll when it withstands two or more foldings.

In the film folding operation, many of the film samples which withstand not more than five foldings sustain cracks along sharp bends formed in the course of folding. In contrast, all film samples which withstand five or more foldings readily permit the folding operation to proceed rapidly.

From one lot of film samples, one sample having a highspeed tensile strength of not less than 7 kg/mm$^2$ is selected. With one longitudinal end of the film secured in position and the other longitudinal end thereof held tight laterally in the hands of a laboratory attendant, this film is subjected to various forms of tension manually exerted thereon by the attendant's hands. In this case, the attendant is required to give the film a slow pull, a laterally differentiated pull, a rather quick pull, etc. in an effort to reproduce faithfully the manners in which the film in actual production is exposed to varying forms of tension while the film is being handled on a slitter, a printing machine and the like.

As a result of this manual test, it has been demonstrated that the film sample having less than 2 g of tear resistance sustains ruptures of the ends or lateral tears when it is exposed to the laterally differentiated pull or the quick pull, whereas the film sample having 2 g of tear resistance is free from such destructions and the film sample having 3 g or more of tear resistance permits fairly rough handling.

It has been further confirmed that the phenomena of end ruptures and lateral tears sustained by the film occur conspicuously in proportion as the difference between the values of tear resistance in the two perpendicular axes increases, whereas they occur increasingly rarely where the values in the two axes approach each other and are both high.

The critical elongation is an index capable of representing stress crack resistance and chemical resistance with high quantitative accuracy. To be sufficiently practical, the film is required to have not less than 0.1% of critical elongation. From one lot of film samples possessed of well-balanced ORS values in the two perpendicular axes, those having 0.07, 0.1, 0.2 and 0.4% respectively of critical elongation were selected and joined face-to-face with ABS (acrylonitrile-butadiene-styrene) resin plates each 3 mm in wall thickness to produce laminate boards. The laminate boards were vacuum molded to produce washing bowls, which were subjected to the following test. Each washing bowl was filled with hot water at about 95° C. to capacity and left to stand with the hot water. After about 30 minutes of the standing, it was emptied of the hot water. Then, it was again filled with ice water at 0° C. and left to stand with the ice water for about 30 minutes. After the standing, the washing bowl was emptied of the ice water. Then the inner surface of the bowl was wiped with a dry towel to remove adhering water drops.

This test was performed on each washing bowl twice daily, once in the morning and once in the evening, for a period of 100 days. In consequence of this test, it has been confirmed that the bowl using the film sample with 0.07% of critical elongation sustains cracks on the curved surface of the film on the 15th day and that the number of such cracks increases with the number of test days. Consequently, the appearance of this washing bowl as a whole is seriously damaged. In contrast, the washing bowl using the film sample with 0.1% of critical elongation is observed to become slightly cloudy along the curved surface of the film after 30 days of the test and sustain fine cracks on the 100th day of the test. The washing bowl using the film sample with 0.2% of critical elongation is observed to become very slightly cloudy along the curved surface of the film on the 100th day of the test and sustain absolutely no discernible crack. The washing bowl using the film sample with 0.4% of critical elongation is found to produce neither cloudiness nor fine cracks even on the 100th day of the test.

As a result of the practical-service test performed over a period of 100 days, it has been established that the film, to withstand the conditions of practical use, is required to have at least 0.1% of critical elongation, that the film enjoys improved practical performance when it has 0.2% of critical elongation, and that the characteristics of the MMA-based resin can be utilized to full advantage when the film has 0.4% of critical elongation.

The film and sheet of the present invention have been evaluated for their practical utility through the study of their mechanical properties. By synthesis of the results discussed above, it is learnt that the film and sheet of this invention are required to possess:

Not less than 7 kg/mm$^2$ of high-speed tensile strength
Not less than 0.1% of critical elongation
Not less than 2 double folds (preferably 3 double folds) of folding endurance
Not less than 2 g (preferably 3 g) of tear resistance.

It has additionally been confirmed that the film is required to have all these values well balanced in the two perpendicular axes.

The foregoing evaluation of practical utility, particularly with respect to folding endurance and tear resistance, however, may possibly become less significant as the film gains in wall thickness. To ensure objectivity of the evaluation, film and sheet samples specially prepared in increased wall thicknesses were tested further for falling dart impact resistance, critical elongation and high-speed tensile strength.

TABLE 2

| Test Piece No. | Film ORS Long. (kg/cm$^2$) | Film ORS Lat. (kg/cm$^2$) | High-speed tensile strength (kg/mm$^2$) | Critical elongation (%) | Film characteristics Improvement ratio in falling dart impact resistance (%)* |
|---|---|---|---|---|---|
| 25 | 0 | 0 | 0.8 | 0.04 | blank |
| 26 | 4 | 5 | 8 | 0.13 | 350 |
| 27 | 8 | 8 | 12 | 0.26 | 600 |
| 28 | 19 | 20 | 14 | 0.33 | 1800 |

*Improvement ratio in falling dart impact resistance = $\frac{\text{Falling dart impact resistance at given ORS}}{\text{Falling dart impact resistance at ORS} = 0} \times 100$ The values of high-speed tensile strength and critical elongation indicated in the table above are those measured in the lateral axis of the relevant film samples. But, in the right-angled biaxial stretching, the direction of the second axial stretching is indicated as the lateral direction.

From the results of Table 2, it is learnt that the improvement ratio of falling dart impact resistance sharply increases with the increasing ORS value and that the film in an unoriented state exhibits an improvement ratio of 350% and the critical elongation itself is notably heightened where the ORS value is only 5 kg/cm$^2$. Thus, the film enjoys notably improved practical utility.

Through synthesis of the results shown in FIGS. 1 through 4, FIG. 7 and Table 2, it is evident that the specific state of molecular orientation obtained by this invention can be materialized at least tolerably by the film meeting the requirement that the ORS value should fall in the range of from 5 to 30 kg/cm$^2$, preferably from 8 to 20 kg/cm$^2$, the ORS ratio should fall in the range of from 1 to 2 and the ORS difference should be not more than 10 kg/cm$^2$, and perfectly by the film additionally meeting the requirement that the high-speed tensile strength should be not less than 7 kg/mm$^2$, preferably not more than 14 kg/mm$^2$, and the critical elongation should be not less than 0.1%.

Similarly important for the present invention is the fact that the melt flow rate (defined in ASTM, D1238-70-I; hereinafter referred to briefly as MFR) of the film and sheet should be adjusted to fall in the range of from 0.5 to 12 g/10 min. This is because the specific state of molecular orientation contemplated by the present invention becomes difficult to attain when the MFR deviates from the range specified above. When the MFR is less than 0.5 g/10 min., the film and sheet acquire uneven wall thickness such as to render accurate evaluation of their properties difficult. When the MFR exceeds 12 g/10 min., the mechanical properties, particularly tear resistance and falling dart impact resistance, tend to fall even if the ORS value remains unchanged. With a view to keeping the practical-service properties at their high levels, therefore, it is desirable that the MFR should be kept in the range of from 0.5 to 3.6.

It should be noted in this connection that the MFR of the film and sheet, more often than not, assumes a value about 10 to 20% higher than the value of the MFR of the resin used.

In order for the film and sheet of this invention to be vested with the properties (such as weather resistance, scratch resistance, transparency, specular gloss and chemical resistance) which are inherent in the MMA-based resin, it is imperative that the resin to be used should be selected in faithful observance of the following information. For example, when the number of carbon atoms in the acrylic group increases past 4, the weather resistance is seriously degraded so much as to render the film no longer fit for outdoor use. When this film is joined face-to-face with a base material to produce a laminate board, it imparts weather resistance and scratch resistance to the base material with great difficulty.

When the alkyl acrylate content is less than 1% by weight, the film and sheet to be produced has an uneven wall thickness such as to deprive the film and sheet completely of practical utility. When the alkyl acrylate content increases to exceed 15% by weight, the film and sheet not merely suffers from reduction in weather resistance and scratch resistance but also retains, with great difficulty, the structure of molecular orientation in the specific state aimed at by the present invention. Alkyl acrylate is present as a copolymer with MMA.

Examples of alkyl acrylates actually usable for the purpose of this invention include methyl acrylate, ethyl acrylate, propyl acrylate, and butyl acrylate. The weather resistance, specular gloss and scratch resistance of the film and sheet tend to decline in proportion as the number of carbon atoms in the alkyl acrylate increases or the content of the alkyl acrylate in the resin increases. From the practical viewpoint of setting the quality of film at a higher level than is normally expected, therefore, it is advantageous to limit the alkyl acrylate content in the range of from 1 to 7% by weight or limit the alkyl acrylate strictly to methyl acrylate.

The words "MMA-based resin" as used in the present invention refer to a resin composition which contains at least 80% by weight of methyl methacrylate. It can contain as much as 99% by weight of methyl methacrylate. This resin composition may be obtained by suspension polymerization, emulsion polymerization or bulk polymerization, for example. This resin composition may further contain additives such as pigment dye and antistatic agent to suit the occassion.

The ultraviolet ray absorbent to be contained in the film and sheet functions more significantly for intercepting the incoming ultraviolet rays, conferring weather resistance upon the base material covered by the film or sheet and protecting the covered base material against ultraviolet rays rather than for heightening the weather resistance of the film and sheet themselves. Since the effectiveness of the ultraviolet ray absorbent is variable to some extent with the particular kind of the absorbent to be used, the wall thickness of film and sheet to be produced, etc. even when the absorbent content remains unchanged, the selection of the absorbent is made in due consideration of the use intended and the effect aimed at. According to the information acquired by the inventors, the film and sheet do not always require the use of the ultraviolet ray absorbent where the base material to be protected enjoys sufficient weather resistance, but they require the inclusion of at least 0.1% by weight, preferably not less than 0.3% by weight, of the ultraviolet ray absorbent where the base material necessitates interception of incoming ultraviolet rays. When the absorbent is contained in excess of 3% by weight, however, the excess absorbent cannot be expected to bring about any addition to the improvement in the effect of absorbing ultraviolet rays while it goes to degrade the specular gloss, etc. of film and sheet.

The ultraviolet ray absorbents which are effectively usable for the purpose of this invention are those conventionally employed for such purpose, e.g. benzophenone compounds represented by 2,2'-dihydroxy-4-methoxybenzophenone and 2,2'-dihydroxy-4,4'-dimethoxybenzophenone, benzotriazole compounds represented by 2-(2'hydroxy-5'-methylphenyl)-benzotriazole, 2-(2'-hydroxy-3'-tert.butyl-5'-methylphenyl)-5-chlorobenzotriazole and 2-(2'-hydroxy-3', 5'-di-tert.butylphenyl)-5-chlorobenzotriazole, and substituted acrylonitrile compounds represented by 1,1-diphenyl-2-ethoxycarbonyl-acrylonitrile. Among those mentioned above, particularly effective for the purpose are triazole compounds such as 2-(2'-hydroxy-5'-methylphenyl)-benzotriazole and 2-(2'-hydroxy-3'-tert.butyl-5'-methylphenyl)-5-chlorobenzotriazole.

The film and sheet of the specific MMA-based resin strictly selected to acquire the specific state of molecular orientation as described above does not lose but retain the characteristic properties inherent in the MMA-based resin, namely the properties such as weather resistance, scratch resistance, transparency, specular gloss and chemical resistance. Better still, they acquire the mechanical properties which all the conventional countertype films have failed to manifest.

The mechanical properties thus vested on the film and sheet of the present invention are characterized by invariably serving to enhance the practical utility of the film and sheet, although they are selectively manifested depending on the wall thickness in which the film and sheet are to be produced.

A film having a wall thickness of about 10 to 250 microns, for example, endures various processing works such as the winding of the film on a bobbin, the cutting of the film to a given size with a slitter and the printing of the film. It also endures the work for joining the film face-to-face with the resin or wood to produce a laminate. The laminate thus produced enjoys the outstanding mechanical properties of the film joined as the surface layer even when this film happens to have a small wall thickness. Thus, this laminate possesses toughness heretofore unattained by the conventional brittle sheet laminates. The lamination, therefore, contributes a great deal to the saving of resources. When a printed or pigmented film is used in the production of laminates, desired decoration of laminates can be achieved with added effeciency. Further, the properties inherent in the resin enable the substrate's weather resistance to be heightened and the substrate's surface properties such as scratch resistance and specular gloss to be notably improved. When the film and sheet have a suitable amount of ultraviolet ray absorbent dispersed therein, their capacity for absorbing ultraviolet rays can be retained intact for an increased period. When the film or sheet is joined face-to-face with a tough, clear substrate such as of polycarbonate sheet, the vulnerability to scratches which forms one major shortcoming of polycarbonate resins can be remedied to a great extent. When the laminated polycarbonate sheet is used as safety glass in school buildings, sunrooms, show-windows and telephone booths, for example, it can prevent personal injuries by broken glass and protect articles on display or in installation against otherwise possible damage of discoloration and deterioration.

In the case of a thin-wall sheet having a thickness of about 250 to 1000 microns, the properties of tear resistance and folding endurance do not pose any noticeable problem. Frequently, the sheet of this thickness is molded independently in the form of a flat plate or curved plate and used as covers for illumination devices and machines. By this reason, the properties of impact resistance, stress crack resistance and scratch resistance are valued with added significance in such uses.

The film and sheet of this invention combine all these properties without reference to the wall thickness thereof. Thus, sheets made of the MMA-based resin of the present invention in large wall thicknesses on the order of 1000 to 3000 microns enjoy notably enhanced practical utility and find ready acceptance in a wider range of applications.

In a batchwise process, the film and sheet of the MMA-based resin of the present invention are obtained by faithfully following the procedure which comprises the steps of (1) molding the MMA-based resin in the shape of sheet (board), (2) stretching the molded sheet in one axial direction with a tenter, and (3) stretching the monoaxially stretched sheet simultaneously in the perpendicular axial directions.

In step (1), for example, the resin used as the starting material must be thoroughly freed from the accompanying water. This is because the water, if suffered to remain in the resin, produces air bubbles in the stretched resin sheet and the presence of such air bubbles in the sheet impedes smooth progress of the stretching operations in the subsequent steps and impairs the properties to be finally acquired by the finished film and sheet.

The drying of the resin is generally carried out by exposure to a current of hot air of about 80° C. for about 24 hours in an air oven. In this case, the bed of resin spread inside the air oven must be given a uniform thickness (about 3 cm). Otherwise, the resin cannot be sufficiently dried and tends to produce air bubbles.

The current of hot air thus used in the air oven must be passed through a filter of good quality and the air oven itself must be designed so as to admit fresh hot air. Otherwise, dust and other foreign particles find their way into the film being stretched and tend to cause breakage of the stretched film. The resin thus dried is fed in a fixed amount into a space formed between two opposed aluminum plates, for example, and then molded in the shape of a plate under application of heat and pressure. When the molding is effected by use of a 50-ton compression molding machine, the molding conditions must be selected so that the temperature of the press falls in the range of from 200° to 260° C., the pressure exerted by the press in the range of from 150 to 220 kg/cm$^2$, the preheating time in the range of from 3 to 5 minutes and the time of pressure application in the range of from 1 to 3 minutes. These conditions are adjusted in due consideration of the softening point of the resin to be used, the flow characteristics of the resin and the thickness of the plate-shaped article desired to be produced. To permit ready adjustment of the conditions, the relative data of the conditions to be determined by a preliminary test and plotted on graphs will prove quite convenient. Particular precautions must be exercised in this molding step to ensure that the aluminum plates should possess perfectly smooth surfaces, the operators engaging in the molding operation should master the best timing for transfer of the hot resin from the step of preheating to the step of pressing and the amount of the resin actually used should be slightly greater than the exact amount found by calculation to be needed so that the molded plate of resin, when removed from the dies, is found to have mold fins protruding from its corners. All these conditions must be fully satisfied for the purpose of ensuring thoroughness of the melting and fusing of the particulate resin used as the starting material, giving a perfectly uniform wall thickness to the molded resin plate and preventing the molded resin plate from entrapping air bubbles therein.

The molded resin plate which has cooled off is cut in the substantially middle portion thereof into sections of a size of, say, 200 to 400 mm. The cutting in this case must be made attentively so as not to impart notches to the cut edges of the resin plate. Punching or some other similarly violent means of cutting, therefore, must be avoided in the cutting of the resin plate.

In step (2), the cut section of the molded plate is held fast in position by having its longer lateral sides pinched by the tenter clips and hot stretched in one axial direction and, thereafter, cooled and removed from the clips. The conditions adopted for this stretching are 100° to 200° C. of internal temperature of the stretching bath, 1.5 to 6 of stretching ratio (i.e., the ratio of the lengths of the portion of the plate subjected to stretching before and after the stretching) and 0.5 to 5 minutes of retention time in the stretching bath (from the time the preheating is started to the time the cut section is removed from the clips). From the ranges mentioned above, the optimum values are to be selected in due consideration of the particular kind of resin used and the condition of the orientation desired to be obtained in the film and sheet aimed at. Where the inner temperature of the stretching bath is high, reduction of the retention time in the bath to even within one minute proves all the more advantageous for the purpose of curtailing the time requirement for the stretching step.

In step (3), the sheet stretched in the one axial direction mentioned above is attentively cut in the middle portion thereof in the direction parallel to the direction of stretching into dimensions (of 700 mm in the direction of stretching and 180 mm in the direction perpendicular to said direction of stretching, for example). The cut section of the sheet is then subjected to the subsequent biaxial stretching. In this case, the cut size of the sheet must be adjusted to a certain extent, depending on the stretch ratios in the two axial directions. To prevent the plate from sustaining notches, the section for the biaxial stretching must be cut out of the portion of the sheet which has already been stretched in one axial direction by all means.

The biaxial stretching is effected by having the opposite longer cut sides thereof pinched by the tenter clips and causing the sheet to be stretched in the direction perpendicular to the aforementioned direction of monoaxial stretching, then cooling the stretched sheet and thereafter removing the stretched sheet from the clips. The conditions adopted for this biaxial stretching are 100° to 200° C. of internal temperature of the stretching bath, 1.5 to 6 of stretching ratio (i.e., the ratio of the lengths of the portion of the plate subjected to stretching before and after the stretching) and 0.5 to 5 minutes of retention time in the stretching bath (from the time the preheating is started to the time the cut section is removed from the clips). From the ranges mentioned above, the optimum values are to be selected in due consideration of the particular kind of the resin used and the condition of the orientation desired to be obtained in the film and sheet aimed at.

Where the inner temperature of the stretching bath is high, reduction of the retention time in the bath to even within one minute proves all the more advantageous for the purpose of curtailing the time requirement for the stretching step. The film or sheet which results from the biaxial stretching is cut to suitable sizes in a properly selected middle portion thereof. The cutting of the film in this case must be attentively carried out lest it should sustain notches.

The batchwise method for the sequential two-step stretching of the film and sheet of the present invention has been described above by way of illustration. This method may be applied suitably to any of the known biaxial stretching techniques such as the annular die-inflation biaxial stretching and the T-die simultaneous biaxial stretching in so far as the aforementioned stretching conditions are faithfully reproduced.

The numerical values of various physical properties and their evaluations dealt with in the following working examples and comparative examples are the outcomes of the determinations and ratings whose methods and scales were as described below.

Method for determination of specular gloss: The specular gloss (at an incident angle of 20°) is measured by the method of ASTM D523.
Scale of rating
◎ Not less than 100%
o Not less than 90% and less than 100%
Δ Not less than 80% and less than 90%
x Less than 80%

Method for determination of transparency: The transparency is determined by the measurement of cloudiness in accordance with the method of ASTM D1003.
Scale of rating
◎ Less than 2%
o Not less than 2% and less than 3%
Δ Not less than 3% and less than 4%
x Not less than 4%

Method for determination of scratch resistance: Pencils ("Uni" pencil made by Mitsubishi Empitsu, Ltd.) with leads of varying hardness are sharpened to expose a length of each lead. The exposed lead is scraped flat perpendicularly to the direction of length, pressed against the surface of a given film (or sheet) and, with the pencil inclined by an angle of 45° relative to the surface, slid over the film surface by placing a load of about 500 g thereon. The pencil lead of the highest hardness that inflicts no scratch upon the film surface is found out and the hardness of that pencil is reported. This measurement is carried out in a room controlled at 20° C.
Scale of rating
◎ Not lower than 6H
o Not lower than 5H and lower than 6H
Δ lower than 2H and lower than 5H
x Lower than 2H Method for determination of weather resistance: A given film (or sheet) is subjected to a 1000-hour exposure test in a Fade-O-Meter (made by Toyo Rika) and, after the exposure test, it is tested for tensile strength by the method of ASTM D882 to find the retention ratio defined below.

Retention ratio = $\dfrac{\text{Tensile strength of film after 1000 hour exposure in Fade-O-Meter}}{\text{Tensile strength of unexposed film}} \times 100\ (\%)$ Scale of rating
◎ Not less than 95%
o Not less than 90% and less than 95%
Δ Not less than 50% and less than 90%
x Less than 50%

Method for determination of chemical resistance: At room temperature, a varying smearing substance shown below is applied to the surface of a given film (or sheet) and, after an interval of two hours, wiped off with dry cloth, petroleum benzine or cloth impregnated with water. The film is washed with water, dried for 24 hours and examined to see if any chemical has permeated into the film.

Smearing substances—Coffee, cola, red ink, green ink, neutral detergent, car wax, hair tonic, margalin, ketchup, clayon, insecticide, lip stick, machine oil and felt-pen ink
Scale of rating
◎ Perfect freedom from smearing
o Slight smearing caused by one substance
Δ Slight smearing caused by two substances
x Complete smearing caused by at least one substance Method for determination of falling dart impact resistance: The resistance is determined by the method of ASTM D1709.

Scale of rating
◎ Not less than 9 kg.cm
○ Not less than 6 kg.cm and less than 9 kg.cm
△ Not less than 4 kg.cm and less than 6 kg.cm
x Less than 4 kg.cm Method for determination of critical elongation: The film (or sheet) is examined to confirm that its water content (change of weight of sample film before and after the film's drying at 105° C. for five hours) is not more than 0.5%. This film is cut into strips each having the original thickness (t mm) of the film, a width of 25 mm and a length of 100 mm. These strips are used as test pieces. If the given film happens to have a water content exceeding 0.5%, it is dried in a vacuum drier at room temperature until the water content falls below 0.5%.

The test pieces are examined to confirm that the opposite original surfaces and the cut faces of the test pieces are smooth and free from visible flaws and notches and other smears such as finger prints.

On a stainless steel cylinder of smooth surface having a varying outside diameter (D mm) in a room controlled at a temperature of 20°±1° C. and a humidity of 60±5%, is wrapped round the outer surface of the cylinder in the circumferential direction, with the opposite longitudinal ends of the test piece held fast against the cylinder by suitable means. Although the opposite ends of the test piece need not be held in tight contact with the outer surface of the cylinder, the central portion of the test piece must be held in intimate contact with the outer surface of the cylinder over a length of at least 20 mm in the longitudinal direction of the test piece.

A gauze amply impregnated with p-xylene (purity not less than 98%) is brought into contact with the test piece at the center of the directions of length and width and left to stand at this position for not less than 60 minutes. After the standing, the test piece is visually inspected to see whether the test piece has sustained cracks in consequence of the contact of the p-xylene. When the test piece is found to have sustained cracks, the test described above is repeated by using a stainless steel cylinder of a greater outer diameter. When the test piece is not found to sustain any cracks, the test is repeated by using a stainless steel cylinder of a smaller outer diameter. In this manner, the cylinder of the smallest outer diameter Dc mm on which the test piece sustains cracks as the results of the test is found out. The test is repeated at least three times by using this particular outer diameter and the cylinders of the closest outer diameters to confirm that this particular outer diameter constitutes the boundary for the occurrence of cracks in the test piece. Then the critical elongation, $\epsilon(\%)$, is calculated in accordance with the following formula.

$$\epsilon = t/Dc \times 100$$

Method for determination of high-speed tensile strength: By use of a tensile tester of the type permitting the cross-head to be moved at a fixed speed (Tensilon, marketed by Toyo Boldwing) in a room controlled to a temperature of 20° C., the film (or sheet) is tested for tensile strength under the following conditions.

Sample width—10 mm
Distance between chucks—20 mm
Rate of drawing—400 mm/min.

Method for determination of folding endurance: The folding endurance is determined by the method of ASTM D2176.

Method for determination of tear resistance: The tear resistance is determined by the method of ASTM D1922.

The products of the invention can comprise, consist essentially of or consist of the stated materials.

Unless otherwise indicated all parts and percentages are by weight.

EXAMPLE 1

MMA-based resin pellets (having a methyl acrylate content of 6% by weight, a Vicat softening point of 113° C. and an MFR of 1 g/10 min.) were placed in a layer of an even thickness of 3 cm on the shelf of an air oven and dried in a circulating current of hot air at 80° C. for 24 hours. The air thus in circulation was passed through a clean air filter and was constantly replenished with fresh air at a proportion of one third of the used air.

A 250-gr. portion of the dried resin was placed between opposed aluminum plates of smoothly polished surface and preheated for three minutes on the table of a molding machine heated at 240° C. The molding machine used was a hydraulically operated compression molding machine. After the preheating, the pressure exerted on the resin was increased up to a final level of 200 kg/cm$^2$, at which final pressure the heating was given at 240° C. for two minutes. Then, the molding machine was abruptly relieved of pressure and the compressed resin as held between the opposed aluminum plates was left to cool off. The resin plate, upon removal from the aluminum plates, turned out to be a transparent plate about 1 mm in wall thickness and evenly flat and free from air bubbles and other foreign particles except for mold fins protruding from the outer corners.

In the substantially central portion of the resin plate mentioned above, a piece having an area of 180 mm × 400 mm was attentively cut out with a sharp cutter. (If air bubbles and other foreign particles are detected in the resin plate or notches are found on the edges of the resin plate, a new resin plate must be prepared by repeating the procedure described above all over again.) The cut piece of the resin plate was set in position on the tenter by having its opposite longitudinal sides of 400 mm pinched by the tenter clips, then preheated by passage through the interior of a stretching bath kept at 170° C., stretched to five times the original size in one axial direction and released from the tenter clips. The residence time of the cut piece in the stretching bath was about three minutes. The resin sheet obtained in consequence of the monoaxial stretching was perfectly free from visible air bubbles and flaws. In the substantially central portion of the monoaxially stretched resin sheet, an oblong piece having a length of 700 mm paralled to the direction of stretching and a width of 180 mm perpendicular to said direction of stretching was attentively cut out with a sharp cutter lest the cutting should inflict any notch to the cut edges.

Then, the oblong piece cut from the monoaxially stretched resin sheet was set in position on the tenter by having its opposite longitudinal sides pinched by the tenter clips, preheated by passage through the interior of a stretching bath kept at 165° C., then stretched to 3.5 times the original size in the direction perpendicular to the direction of the aforementioned monoaxial stretching and released from the tenter clips. The residence time of the cut piece in the stretching bath was about one minute. Consequently there was obtained a biaxially stretched resin film about 50μ in wall thickness.

In the central portion of this film, a test piece of an area of 400 mm×400 mm was cut out, with its sides running parallelly to the directions of the stretching, attentively with a sharp cutter lest the cutting should inflict any notch to the cut edges. This cut piece was used as Test Piece No. 1.

With respect to this test piece, the direction of the first axial stretching was indicated as the "longitudinal direction" and the direction of the second axial stretching as the "lateral direction" respectively.

All the test pieces prepared by repeating the aforementioned conditions were designated as Test Piece No. 1.

The film was found to possess conditions of molecular orientation involving ORS values of 7 kg/cm$^2$ in the longitudinal direction and 8 kg/cm$^2$ in the lateral direction, an ORS ratio of 1, and an ORS difference of 1 kg/cm$^2$ and exhibit a high-speed tensile strength of 11.6 kg/mm$^2$ in the lateral direction and a critical elongation of 0.26% in the lateral direction, indicating that the film had satisfactory practical utility.

EXAMPLE 2

The procedure of Example 1 was repeated, except that in the conditions for resin drying, the thickness of the layer of resin pellets placed on the shelf was changed to 6 cm, the temperature of hot air to 90° C. and the length of drying time to 32 hours, that the final pressure involved in the compression molding was changed to 210 kg/cm$^2$, that in the conditions for the first axial stretching, the internal temperature of the stretching bath was changed to 175° C., that in the conditions for the second axial stretching, the internal temperature of the stretching bath was changed to 180° C., the stretch ratio to 4 and the residence time to about 0.5 minute.

The test pieces prepared under the aforementioned conditions were invariably used as Test Piece No. 2. The film obtained was found to possess conditions of molecular orientation involving ORS values of 5 kg/cm$^2$ in the longitudinal direction and 5 kg/cm$^2$ in the lateral direction, an ORS ratio of 1 and an ORS difference of 0 kg/cm$^2$ and show a high-speed tensile strength of 7.6 kg/mm$^2$ in the lateral direction and a critical elongation of 0.13% in the lateral direction, indicating that the film had satisfactory practical utility.

EXAMPLE 3

The procedure of Example 1 was repeated, except that the drying of the resin pellets additionally involved a preparatory drying with a vacuum hopper drier operated at 70° C. for three hours, that in the conditions for the resin drying, the length of drying of the resin was changed to three hours, that in the conditions for the compression molding, the amount of resin was changed to 400 gr., the temperature of the molding machine to 250° C., the length of preheating to four minutes, the final pressure to 210 kg/cm$^2$, the length of pressure application to three minutes and the thickness of the compressed plate to 1.5 mm respectively, that in the conditions for the first axial stretching, the sample was changed to 150 mm×400 mm, the temperature of the stretching bath to 158° C., the stretch ratio to 6 and the size of the sample taken after the monoaxial stretching to 800 mm in length in the direction parallel to the direction of stretching and 150 mm in length in the direction perpendicular to said direction of stretching, and that in the conditions for the second axial stretching, the temperature of the stretching bath was changed to 155° C., the stretch ratio to 6 and the residence time to about 1.5 minutes respectively. The test pieces prepared under these conditions were used as Test Piece No. 3.

The film thus produced was found to possess conditions of molecular orientation involving ORS values of 25 kg/cm$^2$ in the longitudinal direction and 30 kg/cm$^2$ in the lateral direction, an ORS ratio of 1.2 and an ORS difference of 5 kg/cm$^2$ and exhibit a high-speed tensile strength of 13.8 kg/mm$^2$ in the lateral direction and a critical elongation of 0.35% in the lateral direction, indicating that the film had satisfactory practical utility.

Comparative Example 1

The procedure of Example 3 was repeated, except that in the conditions for the compression molding, the amount of resin pellets was changed to 80 gr., the temperature of the molding machine to 240° C., the length of preheating time to two minutes, the length of pressure application to 1.5 minutes and the wall thickness of the compressed resin plate to about 0.3 mm, that in the conditions for the first axial stretching, the size of the sample was changed to 280 mm×400 mm, the internal temperature of the stretching bath to 130° C., the stretch ratio to 2.5, the residence time to about four minutes and the size of the sample taken after the first axial stretching to 600 mm in length in the direction parallel to the axis of stretching and 280 mm in length in the direction perpendicular to said axis of stretching and that in the conditions for the second axial stretching the internal temperature of the stretching bath was changed to 120° C. and the stretch ratio to 2. The test pieces prepared under these conditions were used as Test Piece No. 4.

The film thus produced was found to possess conditions of molecular orientation involving ORS values of 31 kg/cm$^2$ in the longitudinal direction and 32 kg/cm$^2$ in the lateral direction, an ORS ratio of 1 and an ORS difference of 1 kg/cm$^2$ indicating that the film fell short of the acceptable standard because of weak tear resistance.

Comparative Example 2

The procedure of Example 1 was repeated, except that in the conditions for the drying of resin pellets, the thickness of the layer of resin pellets placed on the shelf was changed to 6 cm, the temperature of the hot air to 90° C. and the length of the drying time to 32 hours, that in the conditions for the compression molding, the amount of resin was changed to 80 gr., the length of the preheating time to two minutes, the final pressure to 210 kg/cm$^2$, the length of the pressure application to 1.5 minutes and the wall thickness of the compressed resin plate to about 0.3 mm, that in the conditions for the first axial stretching, the size of the sample was changed to 280 mm×400 mm, the internal temperature of the stretching bath to 120° C., the stretch ratio to 2 and the residence time to about five minutes, that in the conditions for the first axial stretching, the size of the sample was changed to 450 mm in length in the direction parallel to the axis of stretching and 280 mm in length in the direction perpendicular to said axis of stretching and that in the conditions for the second axial stretching, the internal temperature of the stretching bath was changed to 115° C., the stretch ratio to 1.5 and the residence time to about four minutes. The film was ruptured in the course of preparation, making it impossible to obtain Test Piece No. 5.

Comparative Example 3

The procedure of Example 1 was repeated, except that in the conditions for the compression molding, the amount of the resin pellets was changed to 80 gr., the final pressure to 210 kg/cm² and the wall thickness of the compressed resin plate to about 0.3 mm, that in the conditions for the first axial stretching, the size of the sample was changed to 280 mm×400 mm, the internal temperature of the stretching bath to 120° C., the stretch ratio to 2.5, the residence time to about four minutes and the size of the sample taken after the first axial stretching to 600 mm in length in the direction parallel to the axis of stretching and 280 mm in length in the direction perpendicular to said axis of stretching and that in the conditions for the second axial stretching, the internal temperature of stretching bath was changed to 117° C., the stretch ratio to 2 and the residence time to about three minutes.

The test pieces prepared under these conditions were used as Test Piece No. 6.

The film thus obtained was found to possess conditions of molecular orientation involving ORS values of 38 kg/cm² in the longitudinal direction and 39 kg/cm² in the lateral direction, an ORS ratio of 1 and an ORS difference of 1 kg/cm², indicating that the film fell short of the acceptable standard because of weak tear strength.

EXAMPLE 4 and Comparative Example 4

By following the procedure of Example 1, films whose conditions of molecular orientation involved ORS values of 13 kg/cm² (Test Piece No. 7) and 20 kg/cm² (Test Piece No. 8) were prepared from the MMA-based resin used in Example 1.

For comparison, a film whose condition of molecular orientation involved an ORS value of 4 kg/cm² (Test Piece No. 9) by repeating the procedure of Comparative Example 1.

These films were tested for mechanical properties and the results were tabulated in Table 3 together with those obtained of the films of Examples 1-3 and Comparative Examples 1-3.

The films covered in Table 3 were rated for practical utility and the results are indicated in the text.

Test Pieces, No. 1, 2, 3, 4, 7, 8, 9 and 10 were tested for high-speed tensile strength, folding endurance, tear resistance and critical elongation. The data of FIGS. 1, 2, 3 and 7 are obtained by plotting the numerical values of these properties thus obtained.

An overall review of the data of Table 3 reveals that the specific state of molecular orientation which satisfies the present invention is such that the ORS value falls in the range of from 5 to 30 kg/cm².

For the films of this invention, the high-speed tensile strength falls in the range of from 7 to 14 kg/cm² and the critical elongation exceeds 0.1%.

TABLE 3

| Test Piece No. | ORS values (kg/cm²) Long. | ORS values (kg/cm²) Lat. | High-speed tensile strength (kg/mm²) | Critical elongation (%) | Film properties Folding endurance (number of double folds) | Film properties Tear resistance (gr.) |
|---|---|---|---|---|---|---|
| 1 | 7 | 8 | 11.6 | 0.26 | 72 | 6.1 |
| 2 | 5 | 5 | 7.6 | 0.13 | 2 | 6.9 |
| 3 | 25 | 30 | 13.8 | 0.35 | 141 | 2.0 |
| 4 | 31 | 32 | 13.6 | 0.36 | 143 | 1.6 |
| 5 | Film was unobtainable | | — | — | — | — |
| 6 | 38 | 39 | *— | *— | *— | 0.9 |
| 7 | 12 | 13 | 12.8 | 0.32 | 110 | 4.1 |
| 8 | 18 | 20 | 12.9 | 0.35 | 129 | 2.7 |
| 9 | 2 | 4 | 6.1 | 0.07 | 1 | 7.6 |

The values of mechanical properties shown above are those measured in the lateral direction. The mark (*) indicates a test of poor reproducibility such that no reliable result could be obtained.

EXAMPLE 5 and Comparative Example 5

By following the procedure of Examples 1-3 and Comparative Examples 1-3, films, Test Pieces Nos. 10-24, having an approximate wall thickness of 75μ and the varying ORS values shown in Table 4 were prepared and tested for high-speed tensile strength, critical elongation and falling dart impact resistance. The results are shown in Table 4. The same films, Test Pieces Nos. 10-24, were prepared in multiple. Four pieces of each of the lots were piled up and subjected to punching test with a punching metal capable of perforating a rectangle 30 mm×50 mm in area. A similar pile of film pieces was further subjected to cutting test with a shear cutter.

The results are shown in Table 1 and FIG. 4 in contrast to the results of falling dart impact resistance.

The data of Example 5 and Comparative Example 5 also show that the state of molecular orientation of the present invention is such that the ORS values fall in the range of from 5 to 30 kg/cm², the ORS ratios in the range of from 1 to 2 and the ORS differences below the level of 10 kg/cm².

It is further evident that in the films of the present invention, the values of high-speed tensile strength fall in the range of from 7 to 14 kg/mm² and those of critical elongation are not less than 0.1%.

TABLE 4

| Test Piece No. | ORS value (kg/cm²) Long. | ORS value (kg/cm²) Lat. | Film property Falling dart impact resistance (kg · cm) | High-speed tensile strength (kg/mm²) | Critical elongation (%) |
|---|---|---|---|---|---|
| 10 | 3.3 | 4 | 3.5 | 6.3 | 0.07 |
| 11 | 2.7 | 5 | 3.0 | 8.0 | 0.13 |
| 12 | 4.2 | 5 | 4.1 | — | — |
| 13 | 4 | 8 | 4.0 | — | — |
| 14 | 5.4 | 8.8 | 6.0 | — | — |
| 15 | 8 | 8 | 6.9 | 11.0 | 0.26 |
| 16 | 6 | 15 | 5.4 | — | — |
| 17 | 12 | 13 | 9.8 | — | — |
| 18 | 9.5 | 18 | 8.0 | 13.2 | — |
| 19 | 7 | 21 | 6.2 | — | — |
| 20 | 10.5 | 22 | 8.8 | — | — |
| 21 | 10.5 | 25 | 8.9 | 13.5 | 0.34 |
| 22 | 20 | 20.5 | 15 | — | — |
| 23 | 20 | 29 | 16.5 | — | — |
| 24 | 29 | 29.5 | 22 | — | — |

In the table given above, the values of high-speed tensile strength and critical elongation are those measured in the lateral direction.

EXAMPLE 6 and Comparative Example 6

Biaxially stretched films having ORS values of 5, 8 and 20 kg/cm² were prepared by following the procedure of Example 5 and Comparative Example 5, except that the wall thickness of films was changed to 300µ. These films were tested for high-speed tensile strength, critical elongation and falling dart impact resistance.

For the purpose of comparison, the resin plates before stretching were similarly evaluated. The results are shown in Table 2.

The data of Table 2 show that the results of the falling dart impact resistance and critical elongation of the thin-walled sheets of the present invention improve in proportion as the ORS values increase.

EXAMPLE 7 and Comparative Example 7

Biaxially stretched films having an approximate wall thickness of 100µ and ORS values falling in the range of from 8 to 15 kg/cm² were prepared from resin compositions shown in Table 5, by following the procedure of Examples 1–3 and Comparative Examples 1–3.

These films were tested for weather resistance, scratch resistance, chemical resistance, transparency and specular gloss. The results are shown in Table 5.

From the results of Table 5, it is clear that for the produced films to retain intact the properties inherent in the MMA-based resin, the acrylate content of the resin composition should fall in the range of from 1 to 15% by weight as evidenced by the contrast between Test Pieces No. 30 and No. 34 or between Test Pieces No. 32 and No. 35, and that as to the kind of this acrylate, methyl acrylate used alone gives better results than a mixture of methyl acrylate with butyl acrylate.

TABLE 5

| Classification | Test Piece No. | Resin composition | Vicat softening point (°C.) | Specular gloss | Transparency | Scratch resistance | Weather resistance | Chemical resistance | Overall film evaluation |
|---|---|---|---|---|---|---|---|---|---|
| Example | 29 | Methyl acrylate content of 7% by weight (solution viscosity index 0.067) | 112 | ◎ | ◎ | ◎ | ◎ | ◎ | ◎ |
| | 30 | Methyl acrylate content of 1% by weight (solution viscosity index 0.055) | 114 | ◎ | ◎ | ◎ | ◎ | ◎ | ◎ |
| | 31 | Methyl acrylate content of 8% by weight | 108 | ◎ | ◎ | ◎ | ○ | ◎ | ○ |
| | 32 | Methyl acrylate content of 15% by weight | 98 | ◎ | ◎ | ◎ | ○ | ○ | ○ |
| | 33 | Methyl acrylate content of 12% by weight + n-butyl acrylate content of 3% by weight | 95 | ◎ | ◎ | ○ | ○ | ○ | ○ |
| Comparative Example | 34 | Methyl acrylate content of 0.5% by weight | 112 | Δ | Δ | ◎ | ◎ | ◎ | Δ |
| | 35 | Methyl acrylate content of 16% by weight | 93 | ○ | ○ | ○ | x | Δ | x |

Scale for overall evaluation;
◎ Film having the rating of ◎ for all the test items
○ Film having at least one ○ and having neither Δ nor x.
Δ Film having at least one Δ and having no x.
x Film having at least one x.

EXAMPLE 8 and Comparative Example 8

From MMA-based resin compositions having methyl acrylate contents in the range of from 1 to 7% and having varying MFR values, films having an approximate wall thickness of 50µ and ORS values in the range of from 8 to 9 kg/cm² were prepared by following the procedure of Example 6 and Comparative Example 6.

These films were tested for tear resistance and falling dart impact resistance. The results are shown in Table 6.

From the results of Table 6 it is learnt that the mechanical properties of films tend to decline in proportion as the MFR values increase even if substantially the same ORS values were retained.

It is, therefore, desirable that the MFR values of such films should be selected in the range of from 0.5 to 12 g/10 min.

TABLE 6

| Classification | Test Piece No. | Resin composition | MFR (g/10 min) | Scratch resistance (gr) | Falling dart impact resistance (kg.cm) |
|---|---|---|---|---|---|
| Example | 36 | Methyl acrylate content of 7% by weight | 0.5 | 8 | 7.5 |
| | 37 | Methyl acrylate content of 5% by weight | 1.1 | 5.5 | 7 |
| | 38 | Methyl acrylate content of 1.5% by weight | 3.6 | 3.6 | 6 |
| | 39 | Methyl acrylate content of 6% by weight | 4.8 | 2.8 | 4.9 |
| | 40 | Methyl acrylate content of 6% by weight | 12 | 2.2 | 4.0 |
| Comparative Example | 41 | Methyl acrylate content of 1.5% by weight | 0.4 | *— | *— |
| | 42 | Methyl acrylate content of 7% by weight | 13 | 1.5 | 3.8 |

*Measurement of the property failed because of uneven wall thickness of film

EXAMPLE 9 and Comparative Example 9

Films having ORS values in the range of from 8 to 10 kg/cm² and wall thicknesses of 50μ and 150μ were prepared by the same procedure as described above, using resin compositions obtained by adding ultraviolet ray absorbents shown in Table 7 to the resin composition used in Test Piece No. 29 of Example 7 and Comparative Example 7.

Figure 5:
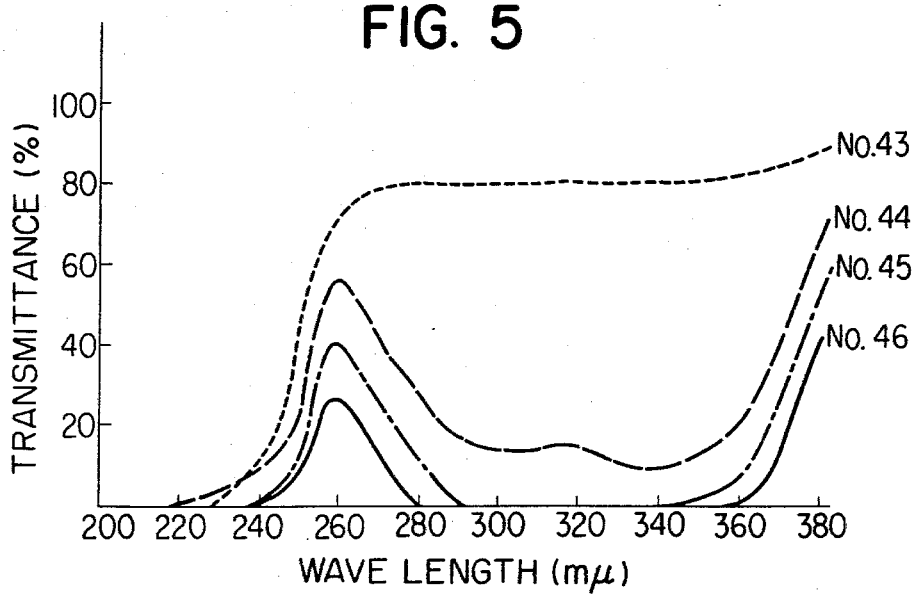
FIGS. 5 and 6 are graphs each showing the transmittance of light.
Figure 6:
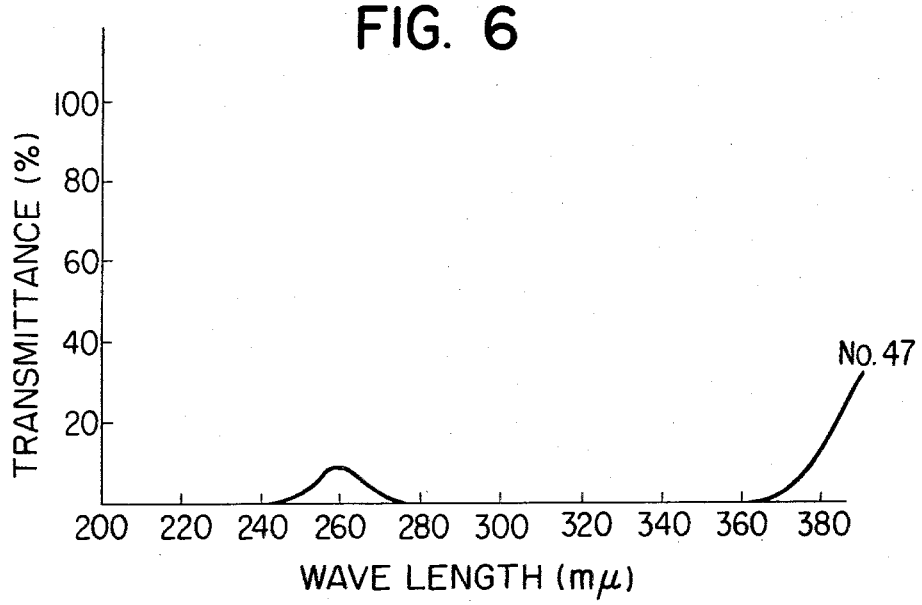

The films, Test Pieces No. 43 to No. 47, were tested for ultraviolet ray absorbing capacity. The results are shown in FIGS. 5 and 6.

The films, Test Pieces No. 43 to No. 48, were each placed on the surface of a white polystyrene foam plate (made by Asahi-Dow and marketed under the tradename of Woodlac B), with the four sides of the plate and film fastened with a frame. The framed laminates were left to stand outdoors for about three months (July through September, 1978) to have the films exposed to the solar ray.

For the purpose of comparison, the same polystyrene foam plate not covered with any film was left to stand under the same weather conditions.

The results are shown in Table 8.

From the results of FIGS. 5 and 6 and Table 8, it is seen:

That for the same ultraviolet ray absorbent content, the ultraviolet ray absorbing capacity varies with the wall thickness of film and sheet.

That the film and sheet possessing the ultraviolet ray absorbing capacity serves to prevent the laminate from discoloration and surface deterioration.

That even the film and sheet containing no ultraviolet ray absorbent is effective in preventing the laminate from surface deterioration.

TABLE 8

| Test piece No. used in laminate | Condition of foam plate after exposure to solar ray | |
|---|---|---|
| | Change of color tone | Surface deterioration of plate |
| 43 | Discolored to light brown | No deterioration observed |
| 44 | Discolored slightly to yellow | " |
| 45 | No change observed | " |
| 46 | " | " |
| 47 | " | " |
| 48 | " | " |
| Comparative plate | Discolored to dark brown | Numerous fine cracks |

EXAMPLE 10 and Comparative Example 10

The film, Test Piece No. 43, and the three commercially available films A, B and C having the resin compositions shown in Table 9 were tested for falling dart impact resistance, transparency, specular gloss, scratch resistance, weather resistance and chemical resistance. The results are shown in Table 9.

It is seen from the results given above that in the MMA-based resin films now available on the market, the modification of resin composition has succeeded in improving their films in impact resistance but entails considerable loss of weather resistance, scratch resistance, specular gloss and transparency which are inherent in the MMA-based resin. In contrast, the film of this invention has fulfilled the heretofore unattainable object of enhancing the film's impact resistance while retaining the inherent properties of the MMA-based resin.

TABLE 9

| Rating Sample | Resin composition for film | MFR of film (g/10 min) | Wall thickness (μ) | ORS values (kg/cm²) Long. | ORS values (kg/cm²) Lat. | Film properties Falling dart impact resistance | Transparency | Specular gloss | Scratch resistance | Weather resistance | Chemical resistance |
|---|---|---|---|---|---|---|---|---|---|---|---|
| 43 | 93% by weight of methyl methacrylate and 7% by weight of methyl acrylate | 1.4 | 50 | 10 | 11 | ◎ | ◎ | ◎ | ◎ | ◎ | ◎ |
| A | 76% by weight of methyl methacrylate and 24% by weight of n-butyl acrylate | 0.5 | 50 | 1.4 | 0 | o | Δ | Δ | x | Δ | Δ |
| B | 65% by weight of methyl methacrylate and 35% by weight of n-butyl acrylate | 0.2 | 50 | 0 | 0 | ◎ | ◎ | ◎ | x | Δ | Δ |
| C | 76% by weight of methyl methacrylate and 24% by weight of n-butyl acrylate | 2.5 | 50 | 0.7 | 0.7 | ◎ | Δ | x | x | Δ | Δ |

TABLE 7

| Test Piece No. | Wall thickness of film | Kind and content of ultraviolet ray absorbent |
|---|---|---|
| 43 | 50 μ | No absorbent contained |
| 44 | 50 | 0.3% by weight of Tinuvin P contained |
| 45 | 50 | 0.5% by weight of Tinuvin P contained |
| 46 | 50 | 1.0% by weight of Tinuvin P contained |
| 47 | 150 | 0.5% by weight of Tinuvin P contained |
| 48 | 150 | 0.5% by weight of Tinuvin 326 contained |

Tinuvin P (made by Ciba Geigy): 2(2'-hydroxy-5'-methylphenyl)-benzotriazole
Tinuvin 326 (made by Ciba Geigy): 2(2'-hydroxy-3'-tert. butyl-5'-methylphenyl)-5-chlorobenzotriazole

EXAMPLE 11 and Comparative Example 11

On one surface of the film, Test Piece No. 46, a picture pattern was printed by means of gravure. The printed film had better specular gloss than a printed transparent polystyrene film and made the picture pattern to appear brightly as though it were a relief image.

This printed MMA-based resin film was heat applied face-to-face with a commercially available rigid polyvinyl chloride (Clear, unoriented) plate to produce a laminate containing the printed surface in the interface.

In an electric decorative board incorporating a 40-W fluorescent lamp, the laminate plate was used as a decorative window with the printed film on the inside. It enjoyed higher brilliance and better decorative effect than the conventional decorative window of po  
chloride resin. After three months' continuous use, the laminate plate showed no discernible decline in specular gloss and brilliance while the conventional polyvinyl chloride resin window suffered serious decline in brilliance.

EXAMPLE 12 and Comparative Example 12

On the film of Test Piece No. 44, a print was produced by means of gravure. The printed film was cut to a size 100 mm×100 mm.

This film was kept immersed in hot water at 100° C. for about five minutes. When it was removed from the hot water, it turned out to be an MMA-based resin sheet 48 mm×45 mm in area.

On the surface of the resin sheet, the pattern of the print initially placed on the film appeared in a proportionally contracted size with notably increased clarity of color.

When a biaxially stretched polystyrene resin film having the same size and bearing a print was subjected to the same test by way of comparison, it barely contracted to a size of about 60 mm×60 mm even after the length of immersion time was increased to 30 minutes.

The results of this test clearly indicate that the film of this invention enjoys the advantage that the complicate means such as an oven toaster and oil bath heretofore employed by the shrink art can be substituted by the very simple means of a plain hot water bath and that the length of shrinking time can be greatly reduced and the failure in the shrinking operation can be prevented.

What is claimed is:

1. A methyl methacrylate-based resin film and sheet containing as comonomer 1 to 15% by weight of an alkyl acrylate whose alkyl group has one to four carbon atoms and 0 to 3% by weight of an ultraviolet ray absorbent, which film and sheet possess a specific supramolecular structure such that the melt flow rate (as measured under Conditions I defined by ASTM, D1238-70) falls in the range of from 0.5 to 12 g/10 min., the orientation release stress falls in the range of 5 to 30 kg/cm$^2$ (based on the method of ASTM D1504), the ratio of the orientation release stresses in the two axial directions (the ratio of the orientation release stress in the direction of its maximum value vs. the orientation release stress in the direction of its minimum value) falls in the range of from 1 to 2, the difference of the orientation release stresses in the two axial directions (the difference of the orientation release stress in the direction of its maximum value subtracted by the orientation release stress in the direction of its minimum value) falls below 10 kg/cm$^2$, the high-speed tensile strength exceeds 7 kg/mm$^2$ and the critical elongation exceeds 0.1%.

2. The methyl methacrylate-based resin film and sheet according to claim 1, wherein the alkyl acrylate is methyl acrylate.

3. The methyl methacrylate-based resin film and sheet according to claim 1, wherein the alkyl acrylate content in the resin composition is in the range of from 1 to 7% by weight.

4. The methyl methacrylate-based resin film and sheet according to claim 1, wherein the ultraviolet ray absorbent content in the resin composition falls in the range of from 0.1 to 3.0% by weight.

5. The methyl methacrylate-based resin film and sheet according to claim 1, wherein the melt flow rate (as measured under Conditions I defined by ASTM, D1238-70) falls in the range of from 0.5 to 3.6 g/10 min.

6. The methyl methacrylate-based resin film and sheet according to claim 1, wherein the orientation release stress (measured in accordance with ASTM, D1504) falls in the range of from 8 to 20 kg/cm$^2$.

7. The methyl methacrylate-based resin film and sheet according to claim 1, wherein the ratio of orientation release stress falls in the range of from 1 to 1.5.

* * * * *